United States Patent [19]

Szablewski et al.

[11] Patent Number: 4,708,289

[45] Date of Patent: Nov. 24, 1987

[54] INJECTION VALVE

[75] Inventors: Piotr Szablewski, Frankfurt am Main; Wolfgang Sauerschell, Oberursel, both of Fed. Rep. of Germany

[73] Assignee: VDO Adolf Schindling AG, Frankfurt am Main, Fed. Rep. of Germany

[21] Appl. No.: 873,246

[22] Filed: Jun. 11, 1986

[30] Foreign Application Priority Data

Jun. 12, 1985 [DE] Fed. Rep. of Germany ....... 3521040

[51] Int. Cl.[4] ......................... B05B 1/34; F16K 31/02

[52] U.S. Cl. .................................... 239/125; 239/451; 239/467; 239/585; 251/129.15; 251/129.22

[58] Field of Search ............ 239/124, 125, 132, 132.3, 239/132.5, 451, 467, 474, 585; 251/129.15, 129.22

[56] References Cited

U.S. PATENT DOCUMENTS

| | | | |
|---|---|---|---|
| 3,797,756 | 3/1974 | Voit et al. | 251/129.22 X |
| 4,033,507 | 7/1977 | Frömel et al. | 239/585 X |
| 4,040,569 | 8/1977 | Knapp | 239/585 X |
| 4,421,280 | 12/1983 | Lewis et al. | 239/585 |
| 4,494,701 | 1/1985 | Hensley et al. | 239/585 |
| 4,511,082 | 4/1985 | Ballik et al. | 239/585 X |
| 4,573,659 | 3/1986 | Homes | 239/585 X |
| 4,575,008 | 3/1986 | Kaczynski | 239/585 X |
| 4,653,720 | 3/1987 | Knapp et al. | 239/585 X |

FOREIGN PATENT DOCUMENTS

| | | | |
|---|---|---|---|
| 2725135 | 12/1978 | Fed. Rep. of Germany | 239/124 |
| 2553834 | 4/1985 | France | 239/585 |

*Primary Examiner*—Andres Kashnikow
*Assistant Examiner*—Jones: MaryBeth O.
*Attorney, Agent, or Firm*—Martin A. Farber

[57] ABSTRACT

In an injection valve for fuel-injection systems for internal combustion engines, the closure member opens in the direction towards the combustion chamber. It has an outer surface which widens towards the combustion chamber. Above the closure member, a swirl chamber is provided in the housing of the injection valve, fuel continuously rotating in said swirl chamber as a result of a continuously open return-flow connection to a valve outlet.

10 Claims, 2 Drawing Figures

INJECTION VALVE

FIELD AND BACKGROUND OF THE INVENTION

The present invention relates to an injection valve, particularly for fuel-injection systems of internal combustion engines, having a magnet winding, a magnet core, an armature which is connected to a movable closure element which cooperates with a valve seat, and having a swirl chamber arranged within the injection valve. Such injection valves, which are intended, in particular, for diesel engines, are well-known to the man skilled in the art.

Upon the injection of fuel it is important that the valve open as rapidly as possible so that the fuel can be injected as rapidly as possible. Furthermore, from the very first moment of the injection, the fuel should be injected with the finest possible degree of atomization so that it burns optimally in the internal combustion engine. In the known injection valves, the closure element opens in each case in a direction opposite the direction of flow of the fuel. This means considerable stroke forces. The swirling of the fuel which is desired upon the injection must again be built up after each opening process, so that at the first moment of the opening the fuel is initially injected without swirl.

SUMMARY OF THE INVENTION

The object of the invention is to improve an injection valve of the aforementioned type so that it can operate as rapidly as possible and that fuel enters the combustion chamber in as finely an atomized condition as possible at the very first moment of injection.

This object is achieved in accordance with the invention by providing that an outwardly diverging outer surface of the closure element rests from the outside against a valve seat and, accordingly, is movable outwardly for opening the valve.

In this way, the closure element, when in open condition, forms a baffle which permits the fuel flowing into the combustion chamber to flow into the combustion chamber distributed uniformly in all directions. This promotes good combustion. Since the closure element opens in the direction of flow it can have a relatively large diameter, thereby a very slight stroke is sufficient to release a large cross section. As a result, the injection valve passes very rapidly from one position into the other, so that the injection of the fuel can take place rapidly.

It is particularly advantageous if a continuously open return-flow connection for the fuel from the swirl chamber is present even when the closure element is closed. In this way, there is obtained a continuous flow. As a result swirl is present even before the opening of the valve and the injection thus takes place with swirl already present from the very first moment of the openings. Furthermore, due to the continuous movement of the fuel within the injection valve, the dirtying of flow channels by deposits from the fuel is avoided.

The fuel to be injected need move over only extremely short paths in the injection valve if the swirl chamber is placed directly upstream of the valve seat. As a result, the danger of the formation of vapor bubbles is greatly reduced since the fuel can heat up only slightly within the injection valve due to the short dwell time of fuel within the swirl chamber.

The closure member is capable of centering itself with respect to the valve seat so that the closure element always closes reliably, as provided by another embodiment of the invention wherein the closure element has a shaft which passes with clearance through the armature and is supported swingably by means of a spherical segment in a seat in the armature on the side facing away from the closure element.

The force of a closure spring, which urges the closure element in the closing direction, can be easily adjusted to the correct value by providing that the shaft of the closure element extends through an adjustment nut. The nut is screwed into a structural part which is firmly attached to the housing of the injection valve and against which one end of a closure spring rests, its other end resting against a shoulder on the armature.

The displacement of the adjustment nut is possible in particularly simple fashion if—according to another embodiment of the invention—the shaft is passed through the adjustment nut in a manner fixed against rotation relative to the adjustment nut, and if the shaft is provided on the side of the armature facing away from the valve seat with an anti-turning means connected fixed for rotation with the armature.

Preferably, the anti-turning means is formed by a yoke which is fastened on the one end to the end surface of the shaft facing away from the valve seat, and on the other end to the corresponding annular surface of the armature. This construction permits swing of the shaft with the closure element without impediment of the anti-turning means.

Upon failure of the electric power, the injection valve closes automatically, a feature attained by forming the armature as part of a pushing magnet. Thereby, when the armature is acted on by current from the magnet coil, the armature can be moved out of the coil.

The magnet coil can be cooled by rearward flowing fuel if a continuously open return connection is conducted both through the armature and also over its outside through the magnet coil to a housing outlet.

An optimum development of the flow in the swirl chamber is obtained by providing the swirl chamber with two tangential feed channels located opposite each other.

The fuel is atomized with particular fineness and injected particularly uniformly into the combustion chamber if the closure member has an arcuately curved outer surface facing the valve seat.

The invention permits of numerous different embodiments. In order to further explain its basic principle, one embodiment has been shown in the drawing and will be described below. In the drawing:

DETAILED DESCRIPTION OF THE PREFERRED EMBODIMENT

Figure 1:
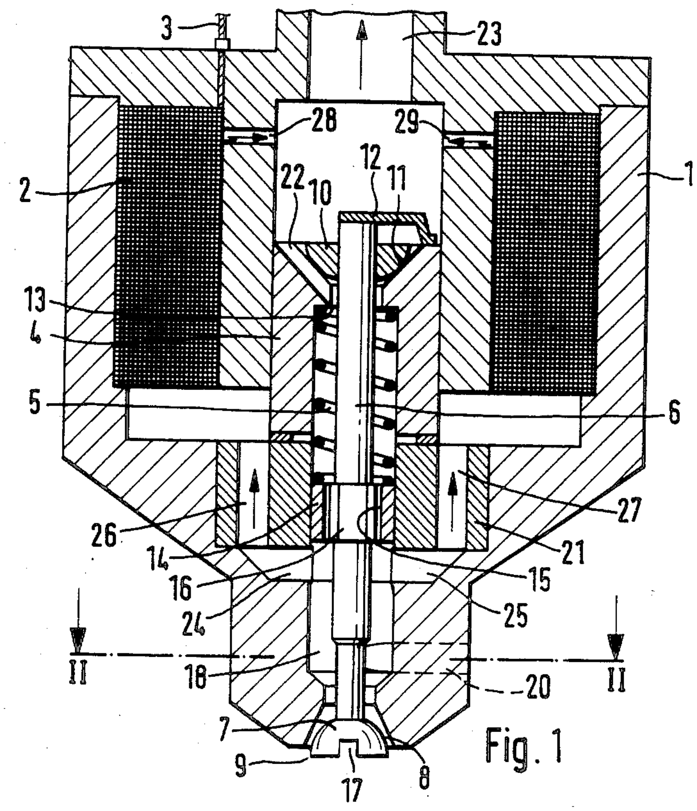
FIG. 1 is a vertical section through a first embodiment of an injection valve according to the invention, shown in position acted on by current.
Figure 2:
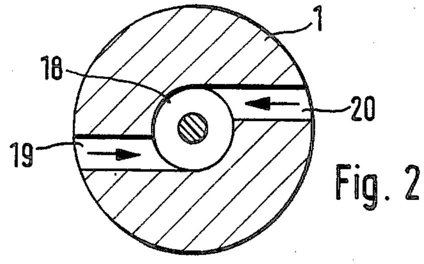
FIG. 2 is a horizontal section through the injection valve along the line II—II of FIG. 1.

In the injection valve of FIG. 1, a magnet coil 2 is positioned in a cup-shaped housing 1, the coil being provided with electrical energy via an electrical connection 3. An armature 4 of soft iron forms a coil core which moves downward, as seen in the drawing, against the force of a closing spring 5 when the magnet coil 2 is energized with current.

The armature 4 is developed as a hollow cylinder. Through it there extends a shaft 6, on the lower end of which there is a closure element 7. This closure element has a downward diverging, arcuately curved outer surface 8 with which the closure member 7 can rest in sealing fashion in closed position against a conical, downwardly widening valve seat 9. On the end of the shaft 6, opposite the closure element 7, the shaft 6 has a hemispherical segment 10 which rests in a conical seat 11 in the armature 4. In this way, the shaft 6 can swing relative to the armature 4 so that the closure element 7 can align itself with the valve seat 9. On the upper end surface of the shaft 6 there is soldered a strap 12, the other end of which strap is soldered alongside the seat 11 firmly to the armature 4. This strap 12 forms an anti-turn device which prevents the shaft 6 from turning relative to the armature 4.

The aforementioned closure spring 5 rests at one end against a shoulder 13 within the armature 4 and at the other end against an adjustment nut 14 which is screwed into a support part 21 which forms a unit with the housing 1. This adjustment nut 14 has a hexagonal hole 15 through which the corresponding hexagonal portion 16 of the shaft 6 engages with clearance. As long as the strap 12 does not attach the shaft 6 to the armature 4, the shaft 6 can be turned relative to the armature 4, for instance by means of a screw driver inserted into a slot 17 in the closure element 7. In this way the adjustment nut 14 is also turned so that it moves upward or downward in the armature 4 and the tension of the closure spring 4 is thereby changed. When the tension of the closure spring has been adjusted correctly, the strap 12 can be soldered fast, thus preventing a further displacement.

There is essential for the invention a swirl chamber 18 which is located in the housing 1 directly above the valve seat 9. Feed channels 19, 20 extend from two sides tangentially into the swirl chamber 18, the fuel to be injected passing into the swirl chamber 18 through said channels. Even when the closure element 7 is closed, fuel can pass from the swirl chamber 18 upward through the armature 4 and further through a channel 22 to a valve outlet 23. Parallel to this flow, fuel can flow via channels 24, 25 and holes 26, 27 through the magnet coil 2 and from there via transverse holes 28, 29 also the valve outlet 23. This stream cools the magnet coil 2.

In the open position of the injection valve which is shown in the drawing, the greatest part of the fuel is injected with a swirling movement over the outer surface 8 of the closure element 7 into the combustion chamber, not shown in the drawing. If current no longer flows in the magnet coil 2, then the closing spring 5 pushes the armature 4 upward until the closure element 7 is tightly seated in the valve seat 9 and the injection is thus interrupted.

We claim:

1. An injection valve, particularly for fuel-injection systems of internal combustion engines, comprising:

a valve seat, a movable closure element which cooperates with said valve seat, a magnet winding, a magnet core, an armature which is connected to said closure element and a swirl chamber located within the injection valve; and wherein said closure element has an outwardly diverging outer surface which rests, from the outside of the valve, against said valve seat, said closure element being movable outwardly for opening the valve; and a further seat is disposed on said armature on the side thereof facing away from said closure element, and wherein said closure element comprises a shaft which passes with clearance through said armature and terminates in a hemispherical element, said shaft being supported swingably by means of said hemispherical element in said further seat.

2. An injection valve according to claim 1, further comprising a return-flow connection for fuel from the swirl chamber, said connection being continuously open when the closure element is positioned for closing the valve and for opening the valve.

3. An injection valve according to claim 2, wherein said swirl chamber is located directly upstream of said valve seat.

4. The injection valve according to claim 2, wherein said swirl chamber has two tangential feed channels which are located opposite each other.

5. An injection valve according to claim, 1 further comprising a support which is rigidly connected to a housing of the injection valve, and wherein said shaft passes through an adjustment nut which is screwed into said support, said valve further comprising a closure spring having one end which rests against the housing, the other end of which spring rests against a shoulder of said armature.

6. An injection valve according to claim 5 further comprising an anti-turning means, and wherein said shaft is passed through the adjustment nut in a manner which is non-turnable relative to the adjustment nut and is provided on the side of said armature facing away from said valve seat with said anti-turning means which attaches said shaft fixedly against rotation to said armature.

7. An injection valve according to claim 6, wherein the anti-turning means is formed by a strap which is fastened at one end to an end surface of the shaft facing away from said valve seat and at the other end of the strap on a corresponding annular surface of the armature.

8. The injection valve according to claim 1, wherein the armature forms a part of a pushing magnet so that the armature can be moved out of said magnet winding when the magnet winding is energized by current.

9. The injection valve according to claim 1, wherein said closure element has an arcuately curved outer surface facing said valve seat.

10. An injection valve, particularly for fuel-injection systems of internal combustion engines, comprising:

a valve seat, a movable closure element which cooperates with said valve seat, a magnet winding, a magnet core, an armature which is connected to said closure element and a swirl chamber located within the injection valve; and wherein said closure element has an outwardly diverging outer surface which rests, from the outside of the valve, against said valve seat, said closure element being movable outwardly for opening the valve;

a return-flow connection for fuel from the swirl chamber, said connection being continuously open when the closure element is positioned for closing the valve and for opening the valve; and wherein said continuously open return connection extends from the swirl chamber and is conducted both through said armature and also over its outside through the magnet winding to an outlet of said housing.

* * * * *